F. LEU.
TRUING DEVICE.
APPLICATION FILED DEC. 21, 1915.

1,215,822.

Patented Feb. 13, 1917.
2 SHEETS—SHEET 1.

Inventor,
Frederick Leu

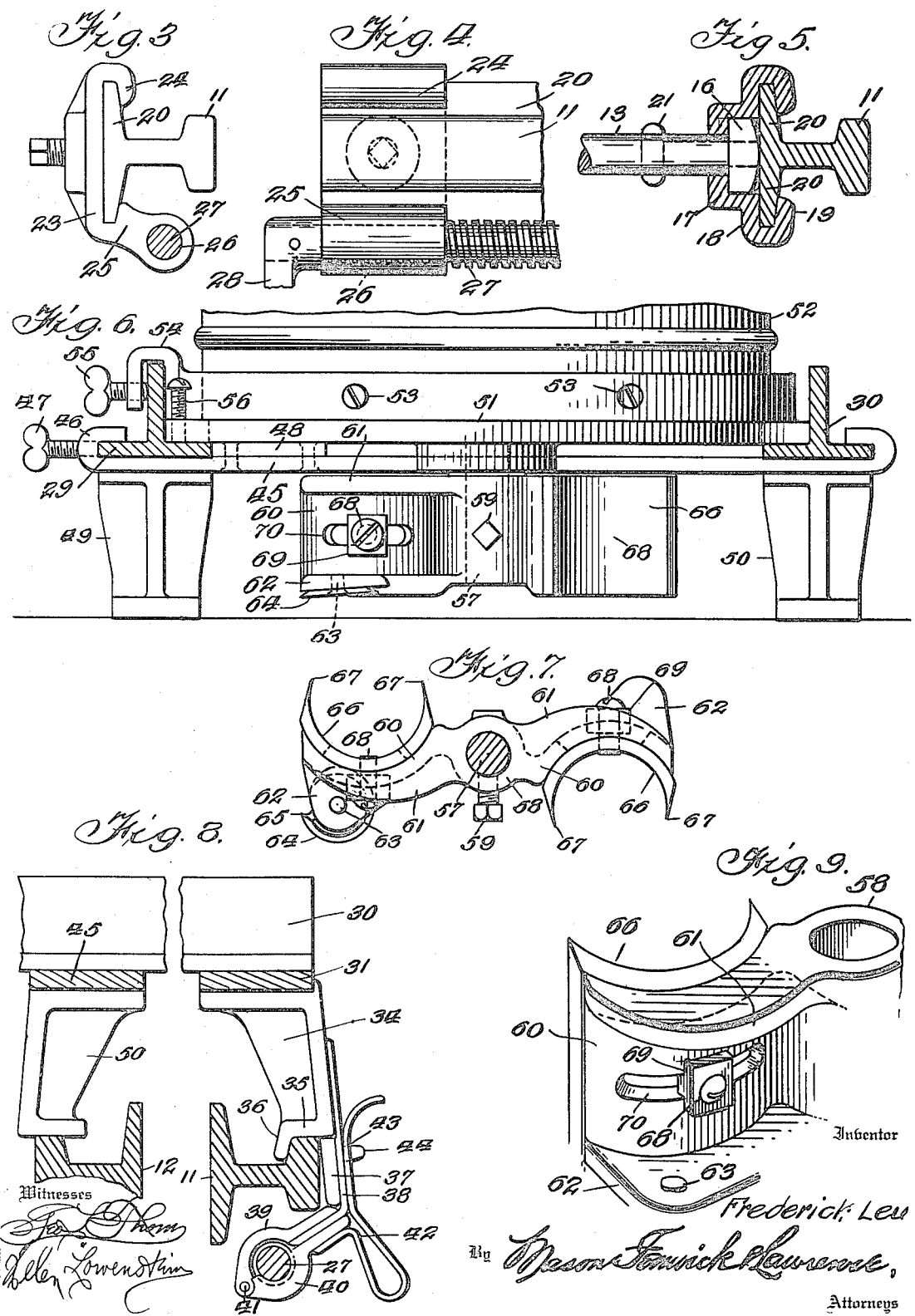

UNITED STATES PATENT OFFICE.

FREDERICK LEU, OF CARMEL, NEW YORK, ASSIGNOR TO MAXMILIAN CALM, OF NEW YORK, N. Y.

TRUING DEVICE.

1,215,822.   Specification of Letters Patent.   Patented Feb. 13, 1917.

Application filed December 21, 1915. Serial No. 68,069.

*To all whom it may concern:*

Be it known that I, FREDERICK LEU, a citizen of the United States, residing at Carmel, in the county of Putnam and State of New York, have invented certain new and useful Improvements in Truing Devices; and I do hereby declare the following to be a full, clear, and exact description of the invention, such as will enable others skilled in the art to which it appertains to make and use the same.

This invention relates to truing devices and more particularly to that type used in dressing meat blocks and the like.

It has for an object to provide a portable frame for supporting a rotary cutter and provision is had whereby the frame may be rigidly clamped to a meat block.

A further object of this invention is the improved means for adjustably supporting a rotary cutter and driving means upon a slidable carriage.

A further object of this invention is the provision of an improved form of cutter in which an adjustable cutter is disposed to cut the fiber of the block at the elevation desired and said cutter also carrying adjustable knives for removing that part of the block overhanging the cut portion of the adjustable cutter.

Further objects will be apparent from the following specification, appended claims and drawings thereof, in which—

Figure 1:
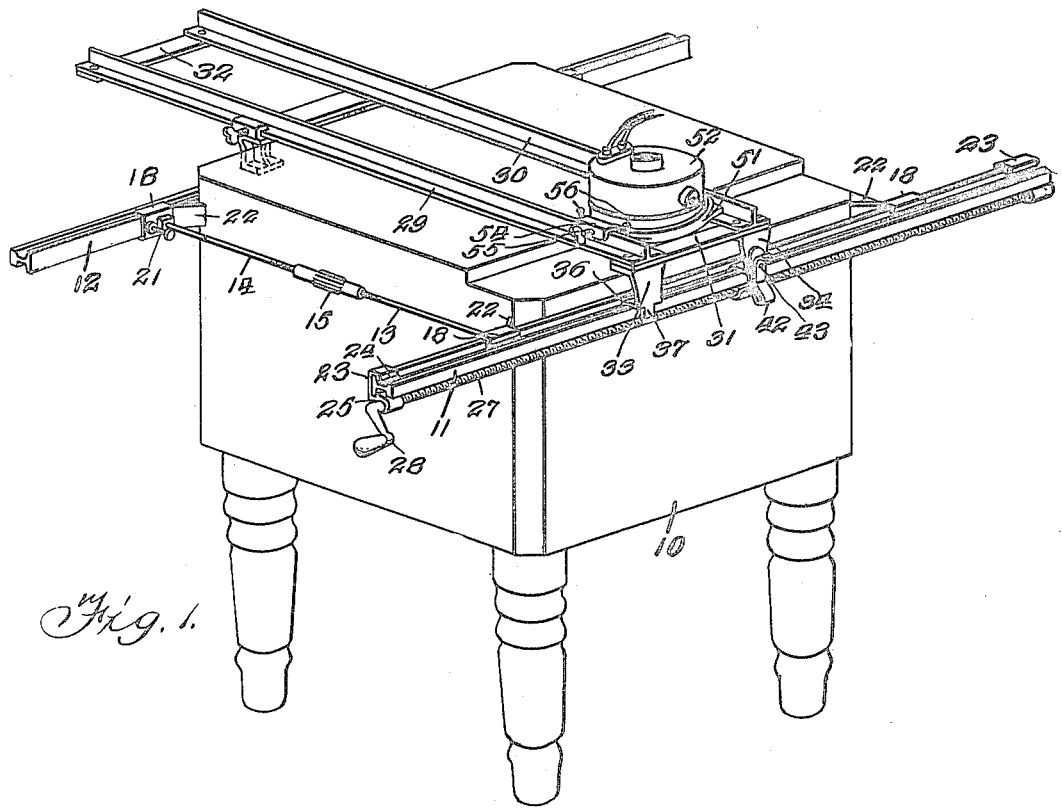
Figure 2:
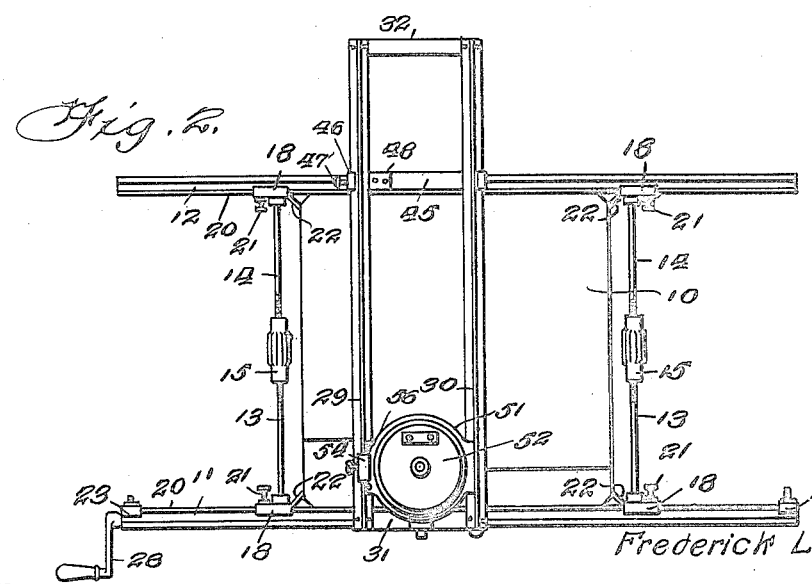

Figure 1 is a perspective view of a meat block showing this invention applied thereto, Fig. 2 is a plan view thereof, Fig. 3 is an end elevation of one of the rails with the bracket member attached thereto, Fig. 4 is a side elevation of the parts shown in Fig. 3, Fig. 5 is a cross sectional view through one of the brackets which supports one end of the tie rods, Fig. 6 is a cross sectional view through the carriage showing the motor and cutter in elevation, Fig. 7 is a plan view of the cutter, Fig. 8 is a sectional view through one of the supporting rails and part of the carriage showing the mounting for said carriage, and Fig. 9 is a detailed perspective view of part of the cutter.

This device is intended for trimming or dressing butchers' meat blocks and the like and it comprises a frame which may be easily attached to a meat block. This frame includes a pair of rails and tie rods of which the rails form a track to support a carriage which may be moved along said rails by a screw carried by one of the rails. This carriage is adapted to pass over a meat block so that a driven cutter supported by said carriage may through the adjustments of said cutter with respect to the carriage and of the movement of said carriage with respect to said track trim all parts of the block lying within the path of the cutter in its transverse or longitudinal movement.

The several elements of this device are clearly shown in the accompanying drawing, in which 10 indicates the usual butcher's meat block and to the opposite sides of this block are clamped the rails 11 and 12 by tie rods comprising the bars 13 and 14 which have their ends threaded with right and left hand threads to receive the turn-buckle 15 and each of the bars 13 and 14 may have a square head 16 which fits in a recess 17 formed in a clamp 18, of which extensions 19 surround and grip the flanges 20 of the rails 11 and 12 as the case may be. Each of the clamps 18 is provided with a thumb screw 21 so that said clamp may be securely locked to the rail against longitudinal movement thereon, and each clamp may be further provided with an extension 22 so that when the clamps are properly applied, the end of the extension 22 engages the meat block and prevents the turn-buckle 15 from approaching the block too closely to interfere with the proper manipulation of said turn-buckle. The rail 11 is also provided at each end with a bracket 23 clearly shown in Fig. 3 of the drawings, and each of these brackets has an extension 24 for gripping the flange 20 of the rail 11 to one side of the web thereof, and also an enlarged extension 25 which is drilled as at 26 to form a bearing for the elongated screw 27 which is of reduced diameter, where it is journaled in the brackets 23. The end of the screw 27 extends beyond the bearing in one of the brackets 23 and receives the crank 28.

The carriage comprises the spaced but parallel T rails 29 and 30 which are connected at their forward ends to a cross bar 31 and at the opposite ends to the cross bar 32 as by rivets or the like. The bar 31 is also supported by the standards 33 and 34 which are quite similar in construction in having a flat face 35 for engagement with the head of the rail 11 and depending ears 36 which engage behind the head of the rail. A depending stem 37 extends in front of the head of the rail 11 and to this extension on the standard 34 is attached a spring 38 which carries one half of a split nut 39 to which the opposite half 40 is hingedly secured as at 41. The member 40 has its inner face adapted to conform with the threads on the screw 27 so that when the members 39 and 40 are held in closed position, the screw 27 advances the carriage through the connection of the split nut. A spring 42 is carried by the member 40 and the spring has an aperture 43 formed therein which receives a pin 44 carried by the member 38.

The rails 29 and 30 support a sliding bar 45 which has one end curved upwardly to engage the outside flange of the rail 30 and has its opposite end curved as at 46 to engage the outside flange of the rail 29. A thumb screw 47 securely clamps the sliding bar 45 in any fixed position on the rails 29 and 30, and to prevent distortion of the rail 29, a keeper 48 is riveted to the bar 45 to reinforce the inner flange of the rail 29. Standards 49 and 50 are carried by this bar 45 and the lower faces of these standards are plane to permit freedom of movement of said standards on the rail 12 in any direction.

The carriage supports an annular frame 51 in which a vertical motor of the electric type 52 may be inserted where it is held by the usual set screws 53 and this annular frame has an extension 54 which overhangs the flange of the rail 29 where the screw 55 carried by said extension serves to rigidly connect said annular frame to the carriage. To permit the shaft of the motor and the rotary cutter, to be hereinafter described, to be slightly pitched to afford sufficient clearance for the cutter, the frame 51 is provided with adjusting screws 56.

The motor shaft 57 which depends below the carriage receives a cutter comprising the hub 58, in which the usual set screw 59 is inserted, and the wings 60. These wings are reinforced by the webs 61 and on the lower web of each wing is formed an enlargement 62 in one of which the screw 63 for supporting the cutter 64 is inserted. The underface of the extension 62 to which the cutter 64 is attached, is beveled to cause the cutting edge of the cutter 64 to be slightly lower than the lower edge of the cutter member to be described, to provide the necessary clearance. The cutter 64 may be the usual circular cutter with a portion thereof ground away to form the cutting point 65 and it is clearly seen that this cutter may be resharpened indefinitely. The wings 60 are curved as shown and in the curved portions thereof, are held cutters 66 of the same configuration as the wings 60. These arcuate cutters may have the opposite edges sharpened as shown at 67 and the cutters are held in place by the screws 68 which pass through the blocks 69 and slots 70 in the wings 60 where said screws engage threaded openings in the cutters 66.

Fig. 9 shows more clearly the formation of the blocks 69 and slots 70 and it is clearly seen that by this construction, it is possible to obtain the maximum of wear from the cutters 66.

When it is desired to true a meat block, the rails 11 and 12 may be securely clamped thereto as by the tie rods 13 and 14 and the clamps 18 may be locked to said rails as by the thumb screws 21. The cross bar 45 is then adjusted on the rails 29 and 30 to have the standards 33, 34, 49 and 50 properly spaced to correspond with the rails 10 and 11, when these standards may be placed on these rails to slidably support the carriage. The cutting unit supported by the motor which in turn is supported by the annular frame 51 may then be placed on the rails 29 and 30 of the carriage, where it may be locked in its first adjusted position, so that as the screw 37 is rotated, its engagement with the members 39 and 40 of the split nut causes lateral movement of said carriage on the rails. As the cutter is rotated by the motor, it is apparent that a section of the upper surface of the meat block may be trued in each complete movement of each cutter across said block. The carriage is then returned to a position at either end of the rails when the cutter is adjusted for a second or subsequent cut, when the screw 27 may be again manipulated to cause said cutter to traverse another section of the meat block and this process is repeated until the entire upper surface of the meat block is trued to conform with the lateral and longitudinal movements of said cutter.

It is apparent that various modifications may be made within the scope of the appended claims and that this invention is not restricted to the details of construction shown in the drawings, which are for illustrative purposes only.

Having thus described my invention, I claim:—

1. In a device of the class described, a frame comprising rails, tie rods for clamping said rails to a block, a turn-buckle for said tie rods, clamps slidably carried by said rails for supporting said tie rods, brackets carried by one of said rails, a screw carried by said brackets, a carriage slidable on said rails, said carriage comprising parallel rails, standards carried by said carriage slidable on said first mentioned rails, a split nut carried by one of said standards for engaging said screw carried by said frame, an annular frame slidable on said carriage, a clamp carried by said annular frame for rigidly attaching said annular frame to said carriage, a motor carried by said annular frame, and a cutter carried by the shaft of said motor.

2. In a device of the class described, a frame comprising spaced rails, tie rods for clamping said rails to a block, a turn-buckle for tightening said tie rods, clamps slidable on said rails supporting the ends of said tie rods, sockets formed in said clamps to receive the ends of said tie rods, thumb screws carried by said clamps for locking said clamps on said rails, guards carried by said clamps for engaging the block to space the tie rods from the block, brackets carried by one of said rails, bearings formed in said brackets, a screw carried by said bearing, a crank carried by said screw, a carriage slidable on said rails, a split nut carried by said carriage engaging said screw, an annular frame slidable on said carriage, a motor carried by said annular frame and a cutter on the shaft of said motor.

3. In a device of the class described, a frame comprising rails, tie rods for holding said rails in clamped relation on the block, a turn-buckle for tightening said tie rods, clamps carried by said rails and tie rods, brackets detachably carried by one of said rails, bearings formed in said brackets, a screw carried by said bearings, a crank carried by said screw, a carriage slidable on said rails, said carriage comprising parallel rails, connecting bars at the ends of said parallel rails, a connecting bar slidable on said rails intermediate the end bars, standards carried by one of the end connecting bars and the slidable connecting bar, said standards on said slidable connecting bar having plane bearing faces thereon, the standards carried by the end connecting bar having lugs depending over the supporting rail of the frame, one of said standards supporting a split nut, and a driven cutter slidably carried by said carriage.

4. In a device of the class described, a frame comprising spaced rails, tie rods for clamping said rails to a block, brackets on one of said rails, a screw journaled in said brackets, a crank carried by said screw, a carriage slidable on said rails, an annular frame slidable on said carriage, a clamp carried by said annular frame for locking said annular frame to said carriage, adjusting screws carried by said annular frame for adjusting one side thereof vertically, a motor in said annular frame, a cutter driven by said motor, said cutter comprising a horizontal cutter for cutting the fiber transversely, and vertical cutters for removing the overhang formed by said horizontal cutter.

In testimony whereof I affix my signature in presence of two witnesses.

FREDERICK LEU.

Witnesses:
W. J. McCaffrey,
Wm. T. Reid.